Jan. 26, 1954
V. HAENSEL
2,667,404
MANUFACTURE OF ALUMINA PARTICLES
Filed Aug. 30, 1951
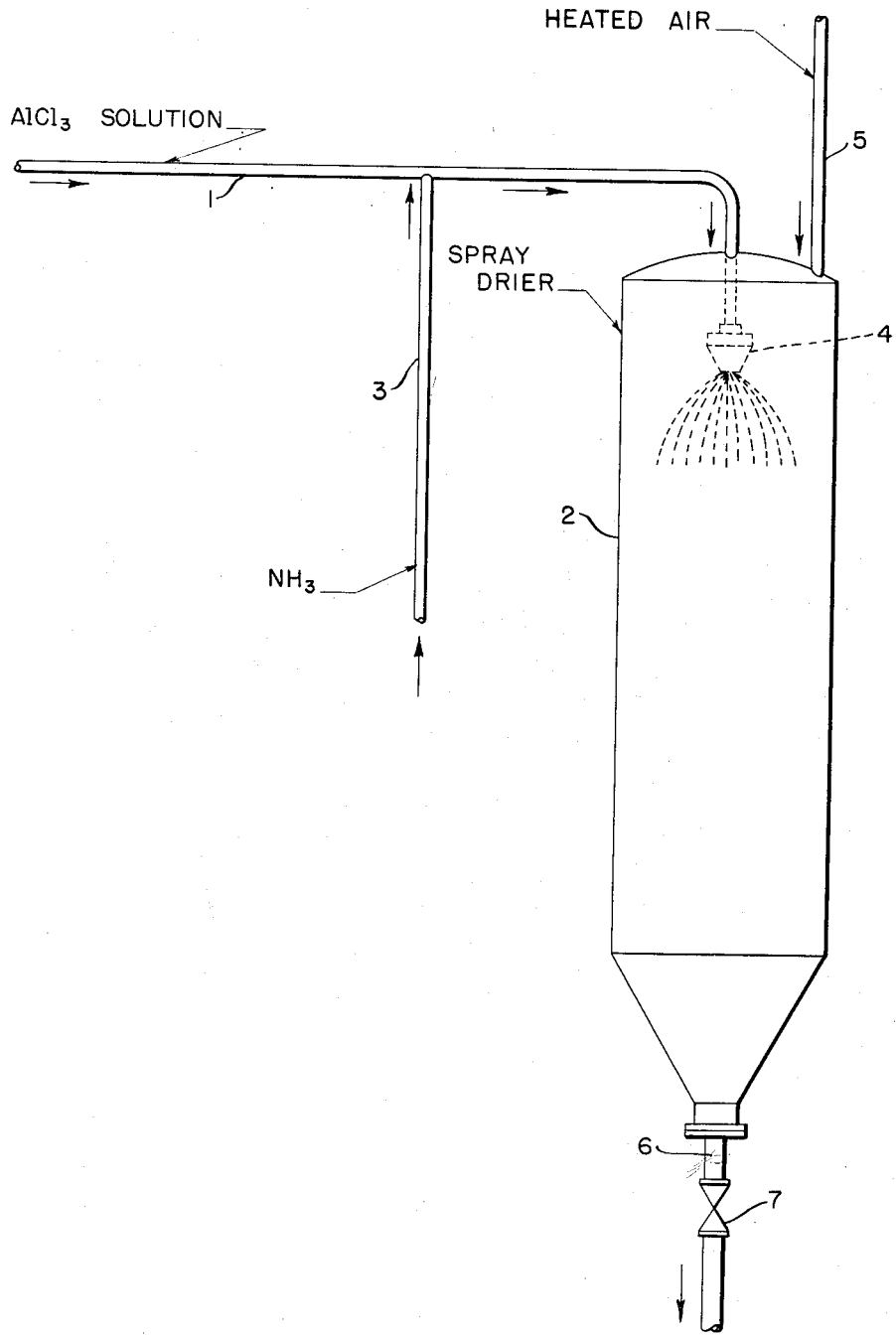
INVENTOR:
VLADIMIR HAENSEL
BY: *Chester J. Giuliani*
*Bernard L Kramer*
ATTORNEYS:

Patented Jan. 26, 1954

2,667,404

UNITED STATES PATENT OFFICE 2,667,404

MANUFACTURE OF ALUMINA PARTICLES

Vladimir Haensel, Hinsdale, Ill., assignor to Universal Oil Products Company, Chicago, Ill., a corporation of Delaware Application August 30, 1951, Serial No. 244,450

3 Claims. (Cl. 23—143)

This invention relates to the manufacture of aluminum hydroxide and more particularly to a novel process for precipitating alumina from a solution of a chloride of aluminum.

In accordance with the present invention a solution of a chloride of aluminum is directed through a pipe line or other suitable conduit into a spray drier, and ammonia is commingled with said solution in the pipe line. As will be hereinafter set forth, this method offers numerous advantages over the prior art methods which are briefly described in the following paragraph.

In one method of the prior art, ammonium hydroxide is commingled with an aluminum chloride solution in a vat or mixing tank and aluminum hydroxide is precipitated therein. The resultant slurry may be pumped to a spray drier for effecting evaporation of water and drying of the resultant aluminum hydroxide. This method has the disadvantage that the precipitated aluminum hydroxide results in a viscous mass which is difficult to pump into and through the spray nozzles and thus requires considerable dilution of the mass in order that it may be pumped satisfactorily.

Another method of prior art comprises spraying an aluminum chloride solution into an atmosphere of ammonia. This method has the disadvantage that the ammonia concentration is difficult to regulate and results in particles which are not uniform. Furthermore, this method has the additional disadvantage that an excess of ammonia is utilized and this in turn means either that ammonia is lost from the system or requires additional equipment to recirculate the same.

It will be noted that the novel process of the present invention avoids the objections of the prior art methods. By injecting the ammonia into the aluminum chloride solution on its way to the spray drier, more concentrated slurries or solutions of aluminum chloride may be used because these will not contain precipitated aluminum hydroxide. Furthermore, the aluminum hydroxide in the novel process of the present invention is not allowed to remain in the wet stage for a considerable time before spray drying as is otherwise encountered in the prior art method where the ammonia is added to the aluminum chloride solution in a mixing vessel. Another advantage to the process of the present invention is that it is unnecessary to store large volumes of slurry in the event that the spray drying equipment should not be in working condition, and thus the precipitated aluminum hydroxide will not be subjected to still longer periods of wet aging prior to the spray drying thereof.

The novel features of the present invention are described further in the accompanying diagrammatic flow drawing which illustrates one specific embodiment in which the invention may be practiced.

Any suitable chloride of aluminum may be used in accordance with the present invention and conveniently comprises the commercially available aluminum chloride hexahydrate. Other suitable but not necessarily equivalent chlorides of aluminum include those containing a chlorine to aluminum mol ratio lower than 1:3 as contained in $AlCl_3$. Such chlorides of aluminum may be prepared, for example, by digesting aluminum chloride solutions with aluminum metal to form a chloride of aluminum containing a lower chlorine content, or by any other suitable method.

As hereinbefore set forth, the aluminum chloride solution may contain a higher concentration of aluminum chloride than utilized in the prior art method previously described. This solution is directed from any suitable source through line 1 to spray drier 2. Gaseous ammonia or an ammonium hydroxide solution is directed through line 3 into line 1 to commingle with the aluminum chloride solution on its way to the spray drier. It is understood that any suitable means may be employed for commingling the ammonia with the aluminum chloride solution as, for example, an elbow or turned pipe facing in the direction of flow, said elbow being of smaller diameter than the diameter of the pipe line carrying the aluminum chloride solution, a vapor nozzle, etc. In order to avoid excessive precipitation of aluminum hydroxide in this line, it is preferred that the ammonia is commingled with the aluminum chloride just prior to introduction of the mixture into the spray drier. The exact point of introduction may vary with the particular plant equipment. However, it is preferred that after the ammonia is introduced, the mixture be introduced into the spray drier within about 10 minutes and preferably not in an excess of about 5 minutes. In a preferred operation the ammonia should be injected just prior to introduction of the mixture into the spray drier.

In the case here illustrated the mixture of aluminum chloride and ammonia is directed through spray nozzle 4 and distributed within the spray drier. In place of spray nozzle 4, any other method of distributing the mixture in the spray drier may be employed, including a rotating disk, perforated plate, etc. It is preferred that the mixture does not impinge against the walls of the spray drier and, therefore, the distributing means and the size of the spray drier will be selected accordingly.

Any suitable spray drying equipment may be employed within the scope of the present invention. In the case here illustrated, heated air is introduced through line 5 to the upper portion of the spray drier 2. It is understood that in place of air any other suitable heating medium may be used including hydrogen, nitrogen, fuel gas, etc., which had been heated to the desired temperature and also that the heating medium may be introduced into the side or bottom of the spray drier.

In the case here illustrated, the dried particles of alumina are removed from the lower portion of the spray drier through line 6 containing valve 7. In another embodiment, one or more cyclone separators may be disposed within or adjacent to the spray drier to separate the alumina particles from heated air, and each is separately withdrawn from the cyclone separator. It is understood that, when desired, a layer of water, oil or other suitable liquid may be disposed in the lower portion of the spray drier and utilized as a means of collecting and removing the alumina particles from the spray drying zone. One method, not illustrated, comprises the use of a flowing stream of water at the bottom of the spray drier to collect and withdraw the alumina particles.

The temperature employed in the spray drier should be sufficient to effect the desired evaporation of water and drying of the aluminum hydroxide. In the case here illustrated in the drawing, satisfactory drying has been obtained when utilizing heated air introduced at a temperature of from about 500° to about 800° F., although lower or higher temperatures may be employed, which may range from 400° F. or lower to 1000° F. or higher.

The particles withdrawn from the spray drier are referred in the present specification and claims as alumina. However, it is understood that these particles may comprise aluminum oxychloride or other combinations of aluminum, oxygen and chlorine. The exact composition of particles will depend upon the particular temperature employed in the spray drier and in some cases may comprise aluminum hydroxide. However, these particles may be subjected to a subsequent drying and/or calcining treatment which will serve to produce a final product comprising predominantly alumina.

The alumina particles withdrawn from spray drier 2 generally will be of substantially spherical shape, and the size of the particles will depend upon the size of the spray nozzle or the speed of rotation of the rotating disk. The substantially spherical particles are of advantage for use as refining agents, dessicating agents, dehydrating agents, etc., as well as for use as a carrier, support, or a component of a catalyst for the conversion of organic compounds. The spherical particles withdrawn from the spray drier, when desired, may be subjected to any suitable purification treatment to remove components which are impurities in the process for which the alumina particles are subsequently to be used. These purification steps generally include washing with water or other solutions to remove soluble impurities. After washing, the alumina particles may be dried at a temperature of from about 200° to about 600° F. for a period of from about 2 to 24 hours or more and then calcined at a temperature of from about 700° to about 1200° F. or more for a period of from about 2 to 12 hours or more. In some cases the washed alumina particles may be composited with the other catalytic components before the drying and/or calcining treatments. In another embodiment, particularly when the alumina particles are recovered as a powder, the powder may be commingled with a suitable lubricant and then pilled, extruded or otherwise formed into larger particles of uniform size and shape.

The alumina, as prepared in the above manner, is particularly suitable for use in the manufacture of active catalysts for the conversion of organic compounds. Thus the alumina may be composited in any suitable manner with a noble metal or compound thereof, and particularly platinum or palladium, in the manufacture of catalysts for use in the reforming of low antiknock gasoline fractions, dehydrogenation reactions, etc. The alumina is also particularly desirable for compositing with metals, oxides or other compounds of the elements in the left hand columns of groups 4, 5 and/or 6 of the periodic table to prepare dehydrogenation catalysts. It is understood that these are merely illustrative uses to which the alumina may be applied and that other uses of the alumina are included within the broad scope of the present invention.

The following example is introduced to illustrate further the novelty and utility of the present invention but not with the intention of unduly limiting the same.

A solution of aluminum chloride hexahydrate in water may be prepared to contain about 35% by weight of $AlCl_3$. This solution may be directed through line 1 to spray drier 2. Gaseous ammonia may be introduced through line 3 and commingled with the aluminum chloride solution, the mixture being passed to the spray drier within one minute from the time of mixing. The mixture is sprayed in the drier by means of a rotating disk, the drier being heated by means of heated air introduced at 600° F. through the top of the drier. The heated air and alumina particles are separated in a cyclone separator, and the spray dried particles are removed from the spray drier and then washed with water containing a small amount of ammonium hydroxide, after which the washed particles may be dried at a temperature of 300° F. for 12 hours and calcined at a temperature of 1100° F. for 4 hours.

I claim as my invention:

1. A process for the production of alumina particles from a solution of a chloride of aluminum which comprises supplying a stream of said solution to a drying zone, introducing ammonia into said stream while in transit to said zone, promptly thereafter spraying the resultant mixture into the drying zone and therein contacting the sprayed mixture with a gas at a temperature sufficient to evaporate water from the mixture.

2. The process of claim 1 further characterized in that said mixture is sprayed into the drying zone within 10 minutes from the time said ammonia is commingled with said solution.

3. The process of claim 1 further characterized in that said ammonia is injected as gaseous ammonia into said solution.

VLADIMIR HAENSEL.

References Cited in the file of this patent

UNITED STATES PATENTS

| Number | Name | Date |
| --- | --- | --- |
| 1,300,110 | Betts | Apr. 8, 1919 |
| 1,337,191 | Buchner | Apr. 20, 1920 |
| 1,337,192 | Buchner | Apr. 20, 1920 |
| 2,036,508 | Svendsen | Apr. 7, 1936 |
| 2,333,948 | Muskat | Nov. 9, 1943 |

OTHER REFERENCES

Comprehensive Treatise on Inorganic and Theoretical Chemistry; page 319; Mellor, vol. 5. Longmans, Green and Co. Copyright 1924.